United States Patent [19]

Hruska et al.

[11] Patent Number: 5,091,252
[45] Date of Patent: Feb. 25, 1992

[54] NON-ORGANIC/POLYMER FIBER COMPOSITE AND METHOD OF MAKING SAME

[75] Inventors: Louis W. Hruska, Geneva; Carl W. Brown, Jr.; Christopher F. Graham, both of Painesville, all of Ohio

[73] Assignee: ELTECH Systems Corporation, Boca Raton, Fla.

[21] Appl. No.: 469,994

[22] Filed: Jan. 25, 1990

Related U.S. Application Data

[63] Continuation of Ser. No. 93,469, Sep. 8, 1987, abandoned, which is a continuation of Ser. No. 768,941, Aug. 27, 1985, abandoned, which is a continuation-in-part of Ser. No. 651,248, Sep. 17, 1984, abandoned.

[51] Int. Cl.$^5$ .......................... B32B 5/16; B32B 9/00
[52] U.S. Cl. ................................ 428/357; 428/368; 428/369; 428/370; 428/372; 428/379; 428/389; 428/394; 428/400; 428/402; 428/403; 428/404; 428/407
[58] Field of Search ............... 428/367, 407, 372, 368, 428/373, 375, 379, 384, 389, 357, 400, 402, 403, 404, 394, 401, 364, 359, 369, 370; 264/9, 115, 122, 127, 109

[56] References Cited

U.S. PATENT DOCUMENTS

| | | |
|---|---|---|
| 3,315,020 | 4/1967 | Gore . |
| 4,042,747 | 8/1977 | Breton et al. ............... 428/323 |
| 4,194,040 | 3/1980 | Breton et al. ............... 428/308 |
| 4,444,640 | 4/1984 | Tsai et al. .................... 524/455 |

Primary Examiner—Lorraine T. Kendell
Attorney, Agent, or Firm—John J. Freer

[57] ABSTRACT

The present invention relates to a new and useful composite fiber. The composite fiber is comprised of non-organic particulates bound to an organic polymer in fiber form. Many non-organic substances are serviceable and valve metal oxides are highly suitable. The organic polymer fiber is advantageously derived from fluorine-containing polymer. The composite fibers can serve as a filter, for instance as a filter-packing material for column chromatography, or can be suitable for separations, e.g., battery separations. The fiber may be compressed, or compressed and sintered, and thereby be useful as bearings or gaskets.

18 Claims, No Drawings

NON-ORGANIC/POLYMER FIBER COMPOSITE AND METHOD OF MAKING SAME

CROSS-REFERENCE TO RELATED APPLICATION

This is a continuation of application Ser. No. 093,469, filed Sept. 8, 1987, now abandoned, which in turn is a continuation of application Ser. No. 768,941, filed Aug. 27, 1985, now abandoned, which in turn is a continuation-in-part of application Ser. No. 651,248, filed Sept. 17, 1984, now abandoned.

BACKGROUND OF THE INVENTION

The use of chemically resistant fibers to form complex shapes or act as reinforcement has long been known. In the art, there are known organic polymer fibers such as extruded polytetrafluoroethylene fibers, inorganic fibers such as carbon fibers, naturally occurring fibers such as spun cotton, and mixes of ceramics and fibers (floor tile). Also, there are materials made of mixes of inorganic fibers and organic polymer fibers, where the organic polymer fibers act as a "glue" to hold the inorganic fibers together. For instance, some literature shows inorganic fibers such as potassium titanate or zirconia used together with polytetrafluoroethylene as a "glue" in the manufacture of sheets, filters, or other finished products. However, this art merely shows the materials used with each other, but not formed into an inorganic-polymer composite fiber as in the instant invention.

A specific example of this art is Canadian Patent 834,895, which discloses a battery separator made of potassium titanate as the inorganic material used with polytetrafluoroethylene as the organic material. Another example of this art is U.S. Pat. No. 3,713,890, which discloses a battery separator made of zirconia as the inorganic material used with polytetrafluroethylene as the organic material. In addition, an article entitled "New Separators for Nickel-Cadmium Cells" in the Journal, *Proc. of the Intersociety Energy Conversion Conference*, 16th, XI, (1981), discloses a battery separator of Zircar TM (zirconia fabric number ZYW15 TM manufactured by Zircar Products, Inc.) reinforced with polytetrafluoroethylene.

Also, it has been known to take an isotropic carbon fiber and press it together with polytetrafluoroethylene for use as artificial tendons in human bodies, as disclosed in U.S. Pat. No. 3,992,725. This patent also discloses that zirconia fiber may be employed instead of carbon fiber.

Also known in the prior art are gaskets and bearings commonly made by molding a blend of inorganic fiber and polymer powder. Typical compositions include 40–80% polymer blends of inorganic and powdered polymer. These blends are compressed and heated to form the final product. The blend precursors are less than 100 microns in diameter, although they may be preblended into larger particles before molding.

In all of these prior art examples, the mixture of polymer and inorganic does not exhibit any non-uniform fiber morphology. According to the prior art, the concurrent use of a polymer and an inorganic does not require the formation of any non-isotropic intermediate, composite fibers. In other words, a composite fiber is not formed, but rather the polymer is simply used "to glue" the inorganic fiber together.

It has also been proposed to incorporate extremely finely divided particles into molten thermoplastics. The resulting thermoplastics can then be shaped. For example, U.S. Pat. No. 4,126,536 discusses the addition of sub-micron-sized particles, such as of titanium dioxide to such a molten substance. In shaping, the resultant material can be extruded through a die and the extrudate broken into fibers. However, the resulting product has the particles incorporated in the fiber, i.e., encapsulated therein, thereby losing the surface character of the fine particles within the polymer.

SUMMARY OF THE INVENTION

It has now been discovered that a non-organic-polymer composite fiber can be made which takes advantage of the non-organic particles surface characteristics. The composite fiber comprises a non-organic particulate material and an organic polymer.

In one preferred combination for chemical resistance, the non-organic material is a very finely-divided valve metal oxide and the organic polymer is a fluorine-containing polymer. The composite fiber is often a dry, free-flowing particulate, most often of a color or hue attributed to the non-organic component. Each discrete fiber can be branched, but need not be, and may sometimes have a tree-shaped appearance with the non-organic particulate firmly bound in the polymer.

Due to the nature of the non-organic and of the polymer, the fiber can exhibit desirable stability. In one aspect, the fiber of the present invention may be useful in making a dimensionally stable diaphragm for a chlor-alkali cell, as disclosed in copending application U.S. Ser. No. 651,247. The composite fibers of the instant invention can not only be hydrophilic and flexible, but they may also be desirably chemically resistant. Furthermore, the composite fibers can have cost advantage, e.g., on a comparative weight basis, when contrasted with certain organic polymers. Moreover, although such may be made with magnesium silicate as the inorganic, it is not necessary to employ asbestos, thus, avoiding the recognized health hazards attendant the use of an asbestos fiber.

The present invention in a most broad aspect pertains to a non-isotropic, organic plus non-organic fiber composite of non-uniform morphology comprising an organic polymer in fiber form having very finely-divided, non-organic, refractory particulates bound firmly with the polymer, at least substantially within the surface thereof so as to be resistant to physical separation from the fiber without fiber destruction.

Also, the present invention provides for a method of making an inorganic-polymer fiber, which method comprises: (1) combining non-organic particulates and organic precursor particles for said polymer fiber; (2) bringing the combination of particulate and particles to an elevated temperature sufficient for the organic polymer to soften and flow under pressure but insufficient for substantial decomposition of the polymer; and (3) vigorously grinding or shearing the combination at such elevated temperature for a time sufficient to allow the softened organic precursor particles to flow under grinding or shearing pressure and fibrillate in the presence of the particulates, thereby firmly binding such particulates with the softened polymer during fiber formation.

Other aspects of the present invention further include compressed bodies of composite fibers, e.g., serving as filters, for instance as a filter packing material for column chromatography, or which may be compressed and sintered, thereby being useful as bearings and gaskets, as well as including reinforced elastomeric materials having composite fiber reinforcement in an elastomeric matrix.

DESCRIPTION OF THE PREFERRED EMBODIMENTS

In general, the non-organic particulate employed can be any such substance or mixture of substances which is refractory, i.e., will retain particulate integrity under the physical conditions of composite fiber formation, while being inert to the polymer fiber substrate. By being inert, the non-organic will be a substance capable of being physically bound to the polymer in processing without chemically reacting with such polymer. Depending generally on the use of the composite fiber product, the non-organic may be pure or contain impurities, can be natural or synthetic, can be elemental or elements in combined form, may be hydrated or the like and change in processing, e.g., lose water of hydration, may be employed in one or more crystalline forms, and can be extremely hard, such as zirconia, or less so, as represented by talc. Suitable non-organic substances may be oxides, carbides, borides, silicides, sulfides, nitrides or mixtures of these substances. Also, the instant invention may suitably employ as the non-organic, silicates, e.g., magnesium silicates and alumino-silicates, aluminates, ceramics, cermets, carbon or mixtures thereof. Complex substances can be serviceable and may be natural, e.g., talc, or synthetic, such as the metal oxides disclosed in U.S. Pat. No. 4,419,278. It is also contemplated to use particulate metals and alloys as well as mixtures, including, for example, mixtures of metals and metal oxides. For most applications of the composite fiber, it is preferred to use a valve metal oxide or a mixture of such oxides. More particularly, the valve metals for these oxides are meant to include titanium, vanadium, chromium, zirconium, niobium, molybdenum, hafnium, tantalum and tungsten. Oxides of other metals that have related characteristics, such as oxides of Al, can also be most useful. Oxides of other elements that border on the periodic chart to the valve metals, such as oxides of Si, also may be most suitably employed. Especially preferred is zirconia as the non-organic for making the non-organic-polymer composite fibers owing to its inert properties, e.g., inert to chemical reaction in a pH range such as from 2 to 14 with the chemicals of a chlor-alkali cell.

Referring most particularly to this non-organic zirconia, also known as zirconium oxide, as a representative example, it occurs in nature as the mineral baddeleyite. The common particulate form of zirconia is a heavy, white, amorphous powder, but it may also occur as crystals, fused aggregates or whiskers. All such particulates can be employed. Zirconia occurs in nature with impurities, and may, for instance, contain some zircon ($ZrSiO_4$) or some hafnium (Hf). In general, naturally occuring materials such as zirconia are suitable with or without the impurities, or there may be used as blends, e.g., blends of zirconia and hafnium. Titania ($TiO_2$) is another inorganic especially useful for its inert properties. It is representative of an inorganic of different crystalline forms and both the rutile or anatase form are acceptable, or mixture thereof. It is most advantageous that if the desired end use of the composite fiber will subject such composite to the harsh conditions of strong acids or strong bases, then substantially pure zirconia will be used.

With regard to the non-organic employed, in general any particulate form or finely-divided size or size distribution can be useful. The non-organic may be small fragments and these are virtually always very finely divided, e.g., generally all more finely divided than about 100 mesh (about 150 microns) and most usually all more finely divided than about 400 mesh (36 microns), thus providing finely-divided, "micron-sized" particulates. However, sub-micron-sized particulates, which have at least substantially all particles finer than one micron, must be used with caution so as to avoid substantial to virtually complete particle encapsulation in the fiber composite during fiber formation. Such gross encapsulation diminishes the benefit which may be derived from particulates at the surface of the fibers. Thus, sub-micron-sized particulates are preferably avoided, or are blended with micron-sized particulates before or in use. Generally, when used herein, "micron-sized" means very finely-divided particulates more coarse than the sub-micron-sized particulates; but nonetheless having a major weight portion, i.e., greater than 50 weight percent, more finely-divided than about 100 mesh (about 150 microns). Mesh as used herein in U.S. Sieve Series. Representative particles can be selected from granules, powders, flakes, aggregates including aggregated powders, fibers, whiskers, crystals and their mixtures. Referring for exemplary purposes to the preferred non-organic zirconia, it will often be employed as a micron-sized particulate, e.g., powder having an average particle size of from 1 to 16 microns, and more typically will be of average particle size from about 5 to 12 microns. Often, many particulates will be sufficiently finely-divided so as to be encapsulated in the fiber but will be only superficially embedded owing to the composite fiber formation conditions, such as temperature and length of formation time.

The useful polymer precursor of the composite fibers is generally any polymer, copolymer, graft polymer or combination thereof which is suitable for being chemically and mechanically resistant to the operating conditions in which the composite fiber will be employed. As an example, chemically resistant for use in a chlor-alkali cell is meant resistant to degradation with respect to the cell chemicals, e.g., caustic. By mechanically resistant for such example, the polymer should be selected so that the composite can maintain a high modulus, i.e., be resistant to inelastic deformation at above normal temperature, e.g., at temperatures up to 100° C. or more, such as up to about 250° C. for polytetrafluoroethylene (hereinafter generally referred to as PTFE polymer). The polymer will be used in particulate form, and it is contemplated that it will always include particles such as powders, aggregates and agglomerates including powder agglomerates which may be found in particle dispersions and particularly colloidal dispersions being especially serviceable, with the useful particles further including granules, chunky-bodied particulates, fibers and also including mixtures, such as mixtures of fibers and granules. When using fibers, it is preferred to use short, chunky fibers or a mixture including such fibers. As the term is used herein, "chunky fibers" typically have a length to diameter ratio not substantially in excess of about 100/1 or so, with many fibers preferably being much less, e.g., having such a ratio on the order of 10/1 to 20/1, thereby permitting greater ease for the fiber to "grow" in composite preparation, as will be more particularly discussed hereinbelow. For convenience, all of these polymer particulates may simply be referred to herein as the "precursor particles" for the polymer fiber. Typically, dispersions of pulverulent polymer are used and preferably for ease of composite fiber production, these particles of the dispersion will have finely-divided character such that their size range is between about 0.05 to 200 microns in diameter. For example, commercially available particulate PTFE polymer dispersions can be obtained which have polymer particles having diameters ranging up to about 0.5 micron. Such dispersions are described for example, in U.S. Pat. No. 4,047,537. These dispersions in a most advantageous form have submicron sized particles. The dispersions are hydrophilic, negatively charged colloid dispersions, containing particles having diameters preferably of about 0.05 micron to about 0.5 micron, suspended in water. However, when used in liquid media, it is acceptable that the polymer may also be partially solubilized or swollen as well as dispersed by such liquid or liquid blend. Another useful and exemplary commercially available product is a fluoropolymer powder agglomerate. Powder agglomerates of commercial PTFE polymer powder, can have average particle size for the agglomerates ranging typically between about 0.1 and 100 microns.

It is also contemplated that the polymer fiber precursors may be mixtures of various polymer particles, e.g., mixtures of fibers, fibrids and granules, as well as to use mixtures of particulate components, e.g., granules, fibrids and fibers of different sizes, lengths, and compositions. The terms fibrid and fibrill as used herein have substantially the same meaning to indicate that shearing action has been employed in their preparation. When mixtures are used, the majority by weight of such mixtures will preferably include the particles of granular form, i.e., granules, powders, or chunky-bodied form, including the aggregates and agglomerates. Hence the fiber and fibrid particulates will usually be in minor amount in the mixture.

As the useful polymers, particularly advantageous are the halogen-containing polymers which include fluorine, e.g., fluorine-containing or fluorine- and chlorine-containing polymers, such as polyvinyl fluoride, polyvinylidene fluoride, PTFE polymer, polyperfluoroethylene propylene, polyfluoroalkoxyethylene (herein often referred to as PFA polymer); polychlorotrifluoroethylene (herein generally referred to as PCTFE polymer), and the copolymer of chlorotrifluoroethylene and ethylene (herein usually referred to as CTFE polymer). Also, useful are various acrylics, which can be serviceable as aqueous as well as non-aqueous dispersions, such as polymethylmethacrylate; phenolics, such as phenolformaldehyde; polyethylene; polystyrene; acrylonitrile-vinyl chloride copolymers; polyvinylidene chloride; polyvinyl chloride; chlorinated polyvinyl chloride; polyesters; polyimides; polymercaptans; polysulfones; and polyolefins. Most preferably for chemical and mechanical stability the fluoropolymer is selected from PTFE polymer PCTFE polymer, CTFE polymer, or PFA polymer. PFA polymer is also known as the copolymer of tetrafluoroethylene and perfluorinated vinyl ether. The most preferred polymer for a most chemically resistant composite is a PTFE polymer.

It is most advantageous that the polymer be used in its relatively untreated or unadulterated form, e.g., usually the form most readily commercially available without being upgraded as by being chemically altered for special use. It is understood that dispersion forms may contain added ingredients, such as surfactants, but for economy it is usually advantageous to avoid further processed polymer. Thus, for economy, the polymer particles have preferably not been chemically treated, e.g., sized or dyed or otherwise colored or pigmented, and need not be highly physically processed. e.g., abraded or the like. It is however contemplated that such upgraded polymer particles may be useful, although not preferred, and that there may be used with the polymer various additives and the like, as is more particularly discussed hereinbelow.

Although simple dry mixtures can be successfully processed to prepare suitable fiber composites, a liquid medium may also be employed. A liquid medium that can be useful in composite preparation is usually aqueous. This may be only water. Typically, the liquid medium is provided by a commercially available polymer dispersion, such as have been mentioned hereinabove. It is contemplated that the suitable liquid media will include a great variety of organic vehicles, including alcohols, hydrocarbons, and halocarbon oils, as well as blends of liquids, e.g., water and alcohol. Thus, as an example, non-aqueous acrylic polymer dispersions can be serviceable as well as the aqueous dispersions.

In general, any amount of polymer employed will be sufficient so long as it links the inorganic particulates into an inorganic polymer composite fiber. This amount will vary with the identity of the polymer used and also with its physical form. The amount of polymer used can also vary with the type and size of the inorganic used as well as the desired service for the composite fiber product. Generally, the polymer will comprise from about 1.0 to about 90 percent, and more often from about 5.0 to about 70 percent, of the inorganic-polymer composite fiber total, with the foregoing percentages all being weight percent and all being on a dry basis. With the most preferred composite fiber, that is the $ZrO_2$-PTFE polymer fiber, and considering an end use as a diaphragm in a chlor-alkali cell, the zirconia will advantageously be present in major weight amount, i.e., exceed 50 weight percent of the product, and most preferably for best hydrophillic property the $ZrO_2$/PTFE polymer ratio ranges from about 2/1 to about 8/1 by weight. As will be recognized by those skilled in the art, such inorganic predominance will impart a hydrophillic property to the composite from the inorganic. In end use applications where a different result is desired, it will be desirable to have a predominant weight amount of the hydrophoboc PTFE polymer.

To enhance formation of the non-organic-polymer composite fibers, it is preferred to employ a fiber-inducing substrate in the mix with a mixture of polymer plus inorganic. Such substrate can serve to enhance formation of polymer fiber, or maintain polymer in fiber form, and thus contribute to desirable composite fiber production. Preferably, the fiber-inducing substrate is a solid, pulverulent, inert material, or mixture of such materials, e.g., a material or mixture that by being inert will not react chemically with the polymer or the inorganic. Group I or Group II metal salts can be useful. Usually such pulverulent material is in granular form. Typical substrate materials are salt (NaCl), $CaZrO_3$, alumina, limestone, sugar, sand, graphite, and the like. This substrate material may generally be added to the mixture of polymer plus inorganic in an amount ranging from about 10 up to 2000 percent by weight, or even more, based on the combined weight of the polymer plus inorganic. More typically, the substrate will be added to the mixture in an amount of from about 20 to 500 weight percent of the combined polymer plus inorganic weight. After use, the substrate particles can be removed from the composite fibers by any mechanical means or combination thereof suitable for separating particulates from fiber, e.g., screening, whereby the large substrate particles are screened from the fiber. If it is desired to most completely remove the substrate from the final composite fiber product, then it is preferable to use a soluble substrate, such as one soluble in a rinse liquid, e.g., a water soluble material such as NaCl, which can be first mechanically separated and then the residue removed from the final product by washing with water.

One useful substrate can be a pulverulent substrate that is the same as the non-organic material. Thus a particularly useful substrate will be zirconia of large particle size. Owing to its hardness, such large, particulate zirconia resists fracture and breakage during even impact grinding preparation of the composite fiber. Furthermore, when zirconia is in use as at least a portion of the organic, breakage of the larger substrate particulates will simply be transferred to useful material for composite preparation. The large zirconia particulates also avoid the use of any wash step for substrate separation, where separation will be needed and it will be desirable to avoid such step. Regardless of the substrate selected it is advantageous to use a substrate having an at least ten times greater average particle size than the average particle size of the non-organic. Usually all of the substrate particles will be retained on a 100 mesh screen (149 microns) and most always the particle size distribution for the substrate will range from 100 microns up to about 800 microns or more, with an average particle size within the range of from about 150 to about 300 microns being typical. Thus, minimum distinctions between average particle size of 20 times or more, e.g., from a 10 microns average particle size for the non-organic to a 200 microns average particle size for the substrate, will be most usual.

Included with the polymer plus inorganic, in addition to a fiber-inducing substrate and a liquid medium, there can be a great variety of additives and agents, especially when the polymer is present as a commercially available dispersion. Typically, additives can include dispersing agents, defoaming agents and wetting agents. Usual agents may also include stabilizers, e.g., dispersion stabilizers, ultra violet light stabilizers and the like, as well as dyes or other coloring agents. These are most typically not deliberately added during mixture formation, but rather are included in the polymer in its commercial preparation.

Usually, the first step in the method of forming the composite fiber product is the preparation of a mix of non-organic material and polymer material, preferably in an appropriate liquid media. The non-organic and the polymer may be preblended to form a material having a slurry or paste-like consistency. However, preblending is not necessary. Thus for instance, the non-organic and the polymer may simply be placed in a mill and the initial milling will cause the non-organic and polymer to blend thereby usually creating a slurry and/or paste. During preblending and/or blending, additional liquid media can be added. Processing should include an elevated mix temperature, e.g., a step of heating the polymer and non-organic at an elevated temperature and for a time dependent upon the identity of the polymer material employed, while vigorously grinding and/or shearing the polymer and non-organic in a grinding and/or shearing action. e.g., as by ball milling. Preferably, a ball mill is used, but a shearing blender, a ribbon blender, double screw blender, Brabender TM mixer, Banbury TM mixer, or Hobart TM mixer may also be used. As long as there is a heating means available in association with the blender, any vigorous shearing and/or grinding action may be employed, including spatula and beaker or mortar and pestle, although for efficient blending, such are not preferred. In general, the nature of the inorganic will allow it to act as a grinding agent. Also, when employed, the fiber-inducing substrate, such as NaCl, will act as a grinding agent. Additionally, loose refractory metal and/or ceramic grinding media, such as steel or porcelain balls, typically of a dimension so as to have an 0.2 cm to 2 cm. diameter, may be employed to enhance the grinding such as in a ball mill.

Generally, the temperature and time is that sufficient to cause the polymer to soften and become flowable under pressure, but insufficient to be readily flowable without applied pressure or to lead to any significant decomposition of the polymeric material. The elevated temperature will typically range from around 50° C. to around 200° C., although more elevated temperatures may be reached, although usually only for a short while. When a mill is used, the temperature may be achieved by heating the mill. For instance, when PTFE polymer granules are employed, the temperature is usually from 100° C. to 180° C., and preferably from about 130° to 150° C. But the temperature will vary depending on the polymer used and its form. It is important that the entire mix of polymer and inorganic be allowed to reach the requisite temperature in order to assure at least substantially complete bonding of the non-organic material with the polymer, thereby combining the non-organic and polymer into the physical form of the composite polymer-non-organic fibers. The heating time is generally from 10 minutes to about 2 hours, and typically about 1 hour, with longer times of 3 hours or more being contemplated, but usually being uneconomical. It is preferred to employ venting during initial heating to drive off any volatiles, e.g., moisture of the slurry. During a typical run where the heating is for 1 hour, venting is usually conducted for about the first 5 to 30 minutes of the heating.

During the heated grinding and/or shearing, as by milling, the heating will be insufficient to provide that the polymer becomes readily free-flowing, but such that the polymer will flow such as when impacted. The polymer is therefore in the nature of being malleable. If the polymer were permitted to flow without shear, e.g., by excessive elevated temperature heating, discrete fiber production could not be attained. Thus the temperature is maintained below the heat induced flow temperature. The polymer particulates will each thereby be typically individually sheared and, being malleable, will be smeared and attenuated to a fibrillated form, e.g., by being impacted by milling. Also, the operation tends to "grow" polymer fibers from polymer particulates, with individual sheared particles often attaching under heated, impact flow condition, one to the other as they are attenuating to provide the growth. Typically, as in an impact grinding action the resulting fiber forms will mimic spiders or trees in form, e.g., be branched or have nucleus with spokes. A great variety of fiber forms can however be expected, including some short and stocky unbranched individual fibers as well as much more lengthy and branched forms. The predominant fiber forms can be somewhat related to the grinding method with an impact grinding action using an exemplary PTFE polymer/zirconia blend, providing a high degree of more branched spider and tree shapes whereas a rotating grinding action with such blend can lead to more individual fibers.

At the same time during the forming and growing of the fibers, the non-organic particulates are being firmly bound to the fibrous polymer substrate. Such binding is mechanically-induced and can include a broad range of attachment, with some particles being more substantially exposed at the polymer surface, as by partial embeddment therein in the nature of a tooth in a gum, while others can be encapsulated if shearing action and fiber growth is continued. It is important that not all of the non-organic particulates be fully encapsulated by the polymer fiber. This assures imparting some of the non-organic particulate character to the fiber surface, e.g., hydrophobicity where a hydrophilic polymer is used. Usually, a broad range or continuum of particle binding in the polymer substrate will be easily and efficiently achieved, ranging from a somewhat loose appearing embedment, but including some particulate encapsulation. Such range can be influenced by the grinding action used, the temperature employed, the proportion of the inorganic and the grinding time. For example, with a preferred PTFE polymer/zirconia mixture, having a major weight amount of the zirconia non-organic, a milling operation using a grinding media and a temperature of about 140° C. with a 2 hour grinding time will produce many highly branched fibers of a polymer substrate that is extensively to virtually completely covered by non-organic particles. Higher temperatures, for example, will result in more individual, unbranched fibers with less coverage of inorganic particles. If the composite is then used to prepare a chloralkali cell diaphragm, for example, where rough treatment in preparation and handling may be encountered, it has been found that the composite can be extremely serviceable without deleterious loss of the non-organic particles in the cell. The composite is not just a mixture, but rather a multitude of fibrous, physical shapes having the particulate exposed at the surface of the polymer fibers while being bound firmly within the polymer. Thus it has been found that the non-organic particulates are readily resistant to physical separation from the fiber composite without fiber destruction, e.g., remain separation-free even under harsh and rough conditions for the handling and use of the composite fibers, as well as from such conditions of use for products prepared from such fibers.

The amount of particle coverage over the polymer surface is most directly influenced by the proportion of inorganic to polymer. This proportion can be dictated by the end use. For example, where the composite produced will be useful as a diaphragm in a chlor-alkali cell, it will be preferable to virtually completely cover the polymer with particulates, while minimizing particle encapsulation, i.e., maximizing particle exposure and thus useful particle surface area. This will enhance diaphragm hydrophillic nature. For other applications, e.g., where the composite will be pressed and may be sintered for use as a bearing gasket material, or where the composite may be felted to be used as a filter or for other paper-like service, or where the fiber may be used as a filler such as to reinforce an elastomer, proportions of the mixture of polymer and organic may be varied. In pressing and sintering, for example, a predominance of polymer over organic may be useful with the inorganic supplying only a low surface area. As mentioned hereinabove, a variety of fiber forms will usually be found after processing a blend of inorganic and polymer.

After an impact grinding such as with a ball mill, the elevated temperature of operation will usually produce a dry product from which the grinding media is first separated out by physical means, e.g., screening. Where a moist material has been produced, similar physical separations can also be useful. Further physical processing such as screening may be utilized to eliminate fines, e.g., a substrate such as salt along with unused inorganic. Air classification is likewise useful for such removal. It may be further utilized for fiber separation, such as classifying short fibers from long. Other separation means accomplishing the same result can be used, e.g., further screening. Where a liquid soluble substrate has been used, the substrate can be removed by washing at any convenient step of the operation. Generally, any typical particle classification and washing procedures are contemplated for use and will be found to be serviceable. Where a non-impact grinding process has been used that does not employ an impact media, such as in a ribbon blending process, the foregoing procedures can be used, but with elimination of the grinding media separation step.

Virtually always, the length/diameter ratio of even the shortest, individual fiber, will be greater than 2/1 but more often will be from 20/1 to 50/1, but can be even 100/1 or more. It is advantageous for many uses, including filters and diaphragms, that the fibers be branched for desirable fiber entanglement. The main trunk of the highly branched inorganic-polymer composite fiber is usually from at least about 1 micron to 1000 microns, and more typically from 5 to 100 microns, in diameter. The length of an individual fiber will typically vary from about 2 microns up to about 25,000–30,000 microns in length.

REPRESENTATIVE PROCESS FOR COMPOSITE FIBER PREPARATION

A very representative method of making the non-organic-polymer composite fibers is as follows. Into a container place the inorganic and add a polymer dispersion thereto. Mix the contents thoroughly before adding a fiber-inducing substrate such as salt. Repeat the mixing procedure. Take a container to dry the sample in. Obtain a gross mixture weight and dry for one hour at an elevated temperature, e.g., at 160° C. Check the sample weight and continue drying to remove all liquid added from the polymer dispersion. Place the thoroughly dried and mixed material in a preheated crock. The crock should be about half full of grinding media and preheated to elevated temperature, such as by heating at 160° for 1 hour. Heat the crock and its contents for 30 minutes at the 160° C. elevated temperature. Remove the crock and place on a mill. Adjust the heating to maintain the 160° C. Mill for a desired time. If the milling is to be carried out at a different temperature, the drying and preheating steps can be adjusted.

In order that those skilled in the art may more readily understand the present invention and certain preferred embodiments by which it may be carried into effect, the following specific examples are afforded.

EXAMPLE 1

A mix is prepared by using 110 grams of Teflon ™ 30B PTFE polymer dispersion (E. I. DuPont de Nemours & Co.), containing about 60 percent solids dispersed in water, including about 6 percent nonionic wetting agent, based on the weight of solids, and having general particle size range for the PTFE polymer of 0.05–0.5 micron. The primary diameters of the PTFE polymer particles in the dispersion average from about 0.2 micron to about 0.5 micron. There is then combined with this dispersion 150 grams of $ZrO_2$ powder having a particle size such that all particles are more finely-divided than 325 mesh (44 microns), 800 grams of NaCl, and 2400 grams of 0.5 inch (1.27 cms.) diameter steel balls. The procedure followed is the "Representative Process" described hereinabove in connection with the examples, but at a temperature of 140° C.

In the meantime, a ball mill grinder is pre-warmed to 140° C. The dispersion is placed in the mill and ground with heating at 140° C. for 1 hour. During the first 10 minutes of heating, the mill is vented to allow escape of the moisture from the aqueous dispersion. The product is then screened with a 0.375 inch (0.9525 cm.) mesh screen to remove the steel balls. If desired, the product may then be washed in water to remove the salt. The resultant product is composed of individual hydrophilic highly branched, rough surfaced, non-isotropic zirconia-polytetrafluoroethylene composite fibers irregular in shape, texture and inorganic distribution, as well as having non-uniform morphology. In general, virtually all individual composite fibers have a length/diameter ratio of greater than 2/1, with many of the main trunks having a length approaching approximately 10,000 microns and a diameter of approxiamtely 20 microns. The fiber is an off-white, free-flowing and somewhat fluffy particulate, dry to the touch and having a soft feel and texture. The non-compacted fiber has a specific gravity of approximately 4–5 grams per cubic centimeter.

EXAMPLE 2

The procedure of EXAMPLE 1 was repeated except that 156 grams (g) of $CaZrO_3$, −48 to +100 mesh, was substituted for the 800 g of NaCl and a Brabender mixer was used instead of a ball mill. The result is highly branched zirconia-PTFE polymer composite fibers similar in size and shape to those of Example 1.

EXAMPLE 3

The procedure of EXAMPLE 1 is repeated except that a dry PTFE polymer powder having an average particle size of 100 microns is used, the mix is heated to 135° C. instead of 140° C. The result is highly branched zirconia-PTFE polymer composite fibers similar in size and shape, as well as general characteristics, to those of Example 1.

EXAMPLE 4

A mix is prepared by mixing 45 g (grams) of a PFA polymer dispersion, 45 g zirconia, and 240 g of NaCl. The procedure used is the hereinabove described "Representative Process", with the grinding of the mixture being in a ball mill useing number 15 steel balls (0.25 inch (0.635 cm.) diameter), and it is conducted at 110° C. for 40 minutes, with venting during the first 20 minutes. The result is highly branched zirconia-PFA polymer composite fibers similar in size and shape and characteristics to those of Example 1.

EXAMPLE 5

The procedure of EXAMPLE 4 is repeated except that 45 g of $TiO_2$ is used instead of $ZrO_2$. The result is highly branched titania-PFA polymer composite fibers similar in size and shape and characteristics to those of Example 1.

EXAMPLE 6

The procedure of EXAMPLE 4 is repeated except that a temperature of 135° C. is used instead of 110° C. The result is highly branched zirconia-PFA polymer composite fibers in general having a length/diameter ratio of greater than 2/1 and other characteristics as described in Example 1.

EXAMPLE 7

Into a mortar there is charged 0.4 weight parts of the PTFE polymer dispersion of Example 1 together with 10 weight parts of zirconium oxide powder, all passing 325 mesh (44 microns). The mortar and its contents are placed in an oven, heated at 100° C., for 5 minutes. The mortar is removed from the oven and immediately manually (using gloves) vigorously mixed and ground with a pestle for 2 minutes. Thereafter, the resulting ground contents of the mortar are poured into a bottle filled with water, the bottle capped and vigorously shaken. Upon standing, residual zirconia powder immediately settles. There remains dispersed in the water composite zirconia/PTFE polymer fibers such as described in Example 1, e.g., off-white fibrous particulates.

EXAMPLE 8

There is premixed 110.23 grams of sodium chloride, 2 grams of boron nitride (BN) having a less than 53 micron particle size, and 2 grams of a dry PTFE polymer powder passing 12 mesh. A 1.2 liter crock having 317.3 grams of high density $Al_2O_3$ balls is preheated to 125° C. The premix is charged to the preheated crock and then milled for 1 hour. Final temperature of the contents is 148° C. The mill charge is screened to remove the balls, water washed in a dispersator and water rinsed on a 60 mesh screen. The rinse material is dryed at 125° C. in an oven for 5 hours. The product consists of off-white fibrous particulates of a PTFE polymer/boron nitride composite.

EXAMPLE 9

A premix is made with 1,315 grams of sodium chloride, 40 grams of boron carbide ($B_4C$) having a less than 44 micron particle size, and 25 grams of the PTFE polymer of Example 8. Into a 13 liter crock containing 8.3 pounds (3.76 kgs.) of the balls of Example 8, and all preheated to 131° C., there is placed the premix. The mix is milled in the crock for 55 minutes, as heating is continued, the final temperature of the mix being 162° C. Screening of the resulting materials to remove the balls also removes some clumps of milled material. The resulting screened product is water washed in a dispersator and oven dryed at 130° C. overnight. Their results 55.42 grams of light gray, thin fibrous fluffy and hairy particulates of boron carbide-PTFE polymer composite fibers.

EXAMPLE 10

Into the crock of Example 8 there is placed 316 grams of the balls of Example 8. The crock and its contents are preheated to 145° C. and there is then charged to the crock a premix containing 110 grams of sodium chloride, 4.45 grams of the PTFE polymer dispersion of Example 1 and 10.82 grams of alumina ($Al_2O_3$) having a less than 53 micron particle size. The milling time is 70 minutes and the final temperature of the contents is 153° C. After separation, using first a 16 mesh screen and then next a 25 mesh screen to separate out loose salt and alumina, there results short, ribbon-like, branched alumina-PTFE polymer fibers.

EXAMPLE 11

Into the ceramic crock of Example 8 there is placed the same charge of balls as in Example 8 and the combination is preheated to 130° C. Into the preheated combination there is charged a premix containing 110 grams salt, 4 grams of activated carbon having all particles more finely divided than 45 microns, as well as 2 grams of the PTFE polymer of Example 8. The mix is milled for 70 minutes and has a final milling temperature of 140° C. The milled mixture is screened and washed, followed by drying, in the manner of Example 8 but using in the wash a small amount of a liquid non-ionic octylphenoxy polyethoxyethanol surfactant having an HLB of 13.5. There results dark dray, fibrous carbon-PTFE polymer composite fibers.

EXAMPLE 12

Into the crock of Example 9 and using the same charge of balls as in Example 9, both preheated to 130° C., there is charged a premix containing 1315 grams salt, 60 grams of talc, which is a naturally-occuring hydrated magnesium silicate mineral, and 200 grams of the PTFE polymer of Example 8. The contents are milled for 60 minutes and reach a final temperature of 154° C. The product is screened to remove loose salt and free talc and is then washed and dried in the manner of Example 9. There results 59.4 grams of off-white talc-PTFE polymer composite fibers.

EXAMPLE 13

Two die plugs of highly polished cold-rolled steel are prepared for molding. Both plugs have 2¼ inch (5.72 cms.) die faces. Magnesium stearate mold release powder is lightly brushed on each die face. One die plug is enclosed in a 2¾ inch (6.99 cms.) high die cylinder, with the plug being face up. A 10 gram sample of zirconia-PTFE composite fibers made in the manner of Example 1 is poured onto the enclosed die face and manually dispersed with a stirrer. The second die plug is inserted into the die cylinder, face down, to completely enclose the fiber sample.

The sample is compressed in a hydraulic press at 10 KPSI, with the pressure building to the maximum in 20 seconds and then being immediately released (no dwell time). There results a compressed 5.72×0.117 cm. disc having a density of 3.05 gms/cm³. The disc is sintered at 350° C. for one hour. There results a tough, rugged sheet-like material. A similar disc, but vacuum deposited on a 710 micron screen at 25.4 cms. vacuum (Hg guage), rather than hydraulic compression, and then sintered, is cut into a ring. The ring is 0.114 cm. in thickness with a 6.35 cm. I.D. and an 8.26 cm. O.D. The resulting ring is used as a gasket under the jar lid of a 1.2 liter volume porcelain ball mill jar. The ring is successfully used repeatedly in such manner without physical degradation and is regarded as supplying a highly desirable seal in such operation.

What is claimed is:

1. A fiber manufacture of individual, organic polymer fibers, at least some of the fibers being branched, with each individual fibers in said manufacture being non-isotropic, of non-uniform morphology and comprising an organic fluorine-containing polymer and having very finely-divided, non-organic, refractory particulates bound firmly with said polymer at least substantially within the surface thereof, so as to be resistant to physical separation from the fiber without fiber destruction, said non-organic particulates being bound during mechanically-induced fiber formation, with said fiber formation being performed at elevated temperature directly on precursor particles of organic polymer.

2. The fiber manufacture of claim 1, wherein said non-organic particulates are bound firmly in said organic polymer fibers in a continuum of binding arrangements ranging from at least substantial particle encapsulation in said polymer fiber to particles embedded into the surface of said polymer fibers.

3. The fiber manufacture of claim 1, wherein said non-organic particulates bound firmly within the surface of said polymer fibers comprise particles impacted into said fibers at their surface.

4. The fiber manufacture of claim 1, wherein said precursor particles for the polymer fibers are selected from the group consisting of powders, granules, polymer aggregates and agglomerates, chunky-bodied particulates, fragments, chunky fibers and mixtures thereof.

5. The fiber manufacture of claim 1, wherein said organic polymer fibers have diameters within the range of from about 1 micron to about 1,000 microns.

6. The fiber manufacture of claim 1, wherein said non-organic particulates have a major weight portion more finely-divided than about 150 microns.

7. The fiber manufacture of claim 6, wherein only a very minor portion of said non-organic particulates become encapsulated in said organic polymer fibers by impacting into said fibers at their surface.

8. The fiber manufacture of claim 1, wherein said organic polymer fibers are prepared from untreated organic polymer.

9. The fiber manufacture of claim 1, wherein said non-organic particulates comprise very finely-divided particles selected from the group consisting of metal oxides, metal carbides, metal borides, metal silicides, metal sulfides, metal nitrides, silicates, aluminates, ceramics, cermets, carbon, metals, alloys or mixtures thereof.

10. The fiber manufacture of claim 9, wherein said non-organic particulates are selected from valve metal oxides and their mixtures.

11. The fiber manufacture of claim 1, wherein the length of the main trunk of branched fibers are within the range of from 1 micron to about 30,000 microns and the length/diameter ratio for said fibers is greater than 2/1.

12. The fiber manufacture of claim 1, wherein there is in admixture with said composite fibers a fiber-inducing substrate.

13. The fiber manufacture of claim 12, wherein the fiber-inducing substrate is a solid, pulverulent, inert material.

14. The fiber manufacture of claim 13, wherein the fiber-inducing substrate is selected from the group consisting of NaCl, CaZrO$_3$, alumina, limestone, sand, graphite, or mixtures thereof.

15. The fiber manufacture of claim 1, wherein said fibers are an off-white, free-flowing and fluffy dry particulate of soft texture comprised of very finely-divided zirconia bound firmly within the surface of said fluorine-containing polymer.

16. The fiber manufacture of claim 1, wherein said fibers are a free flowing and dry particulate comprised of titania bound firmly within the surface of said fluorine-containing polymer.

17. The fiber manufacture of claim 1, wherein said fibers comprise free-flowing, branched fibers of alumina bound firmly within the surface of said fluorine-containing polymer.

18. The fiber manufacture of claim 1, wherein said individual, fibers are of different lengths.

* * * * *

UNITED STATES PATENT AND TRADEMARK OFFICE
CERTIFICATE OF CORRECTION

PATENT NO. : 5,091,252

DATED : February 25, 1992

INVENTOR(S) : Hruska et al

It is certified that error appears in the above-identified patent and that said Letters Patent is hereby corrected as shown below:

On the title page, Item [75], line 3, after

"Christopher" delete "F." and insert --E.--.

Signed and Sealed this

Twelfth Day of October, 1993

Attest:

BRUCE LEHMAN

*Attesting Officer*          *Commissioner of Patents and Trademarks*